UNITED STATES PATENT OFFICE.

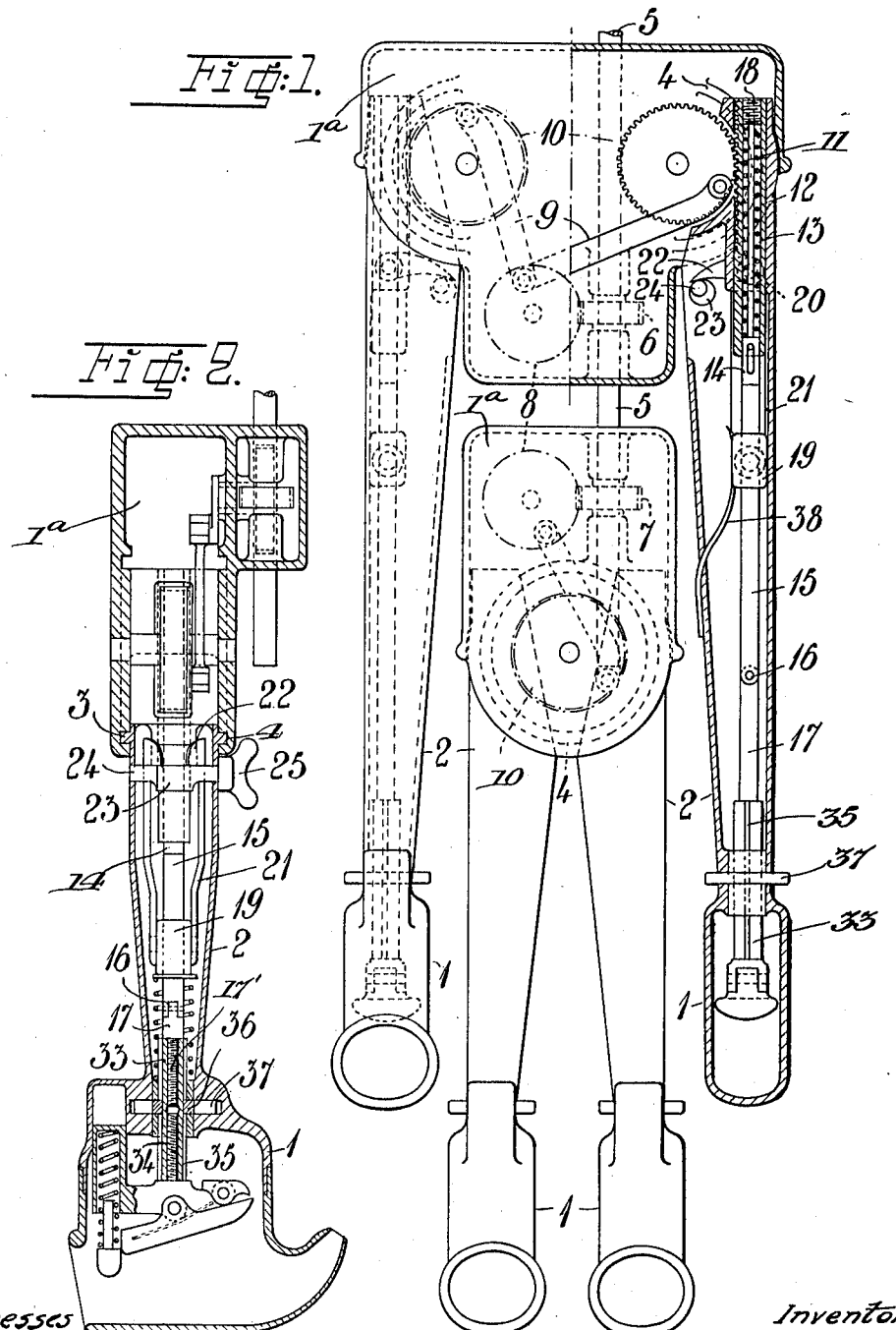

KARL WILHELM JOHANSSON, OF KNEIPPBADEN, SWEDEN.

MILKING-MACHINE.

1,021,192.  Specification of Letters Patent.  Patented Mar. 26, 1912.

Application filed April 25, 1911. Serial No. 623,238.

*To all whom it may concern:*

Be it known that I, KARL WILHELM JOHANSSON, a subject of the King of Sweden, and residing at Kneippbaden, Sweden, have invented certain new and useful Improvements in Milking-Machines, of which the following is a specification.

The present invention refers to a milking machine of the kind in which the teats are worked between two solid walls and milking organs that move backward and forward, and is illustrated in one form of construction in the accompanying drawing, in which—

Figure 1 shows a plan-view of the apparatus with one of the milking elements in horizontal section, while Fig. 2 is a section of one of the milking elements.

The machine is fitted with four milking elements each of which consists of an outer cover, namely a teat cup 1 and hollow arm 2, which may be turned in a horizontal plane by means of flanges 3 entering coacting grooves 4 in a main frame structure 1ª. Every milking organ is fastened to an arm that moves to and fro, which arm in the form of construction shown consists of several parts and receives its motion from a shaft 5 common for all the organs which shaft by means of two screws 6, 7 drives two screw wheels 8 serving as crank disks. By means of crank rods 9 these disks are connected with gear-wheels or gear-segments 10. When the shaft rotates the gear-wheels obtain an oscillating motion which is transmitted to the arms of the milking organs with the aid of racks 11 fitted on them, and which racks are carried by a cylindrical part 12 of the said arms. In this part there is fitted a spring 13 lying against a head 14, which in its turn is lying loosely against an arm 15, which at 16 is connected with the arm 17, supporting the milking organ itself, in such a manner as to allow of the arm 15 being swung laterally. At the other end the spring 13 is lying against a nut 18 screwed into the cylinder 12, and by screwing the nut in or out the tension of the spring may be regulated. In order to enable the milking organ belonging to any one teat being disconnected when that teat has been milked dry the arm 15 runs in bearings 19 which are movably supported by a fork 21 running in bearings that may themselves be turned at 20, and this fork is fitted with an arm 22 with which an eccentric 23 coöperates, and on the shaft 24 of this eccentric there is fixed a wing-screw 25 by means of which the eccentric may set in different positions. If half a turn is given to the eccentric the arm 22 is removed which causes the fork 21 and the bearing 19 to be carried away whereby the arm 15 is turned around its pivot 16. As a result of this the head 14 cannot act upon the arm 15, and the milking organ belonging to it is at rest.

In order to enable the machine to be used with cows having teats of different thicknesses, the action of the arm 17 can be regulated in the form of construction shown in such a manner that it has a screw threaded projection 17' at the end and is there engaged by a turn buckle 33, which also engages a threaded pin 34 on the milking organ. The projection 17' and pin 34 are provided with right-and-left screws, for example projection 17' has a left-handed thread, whereas pin 34 has a right-handed thread. The turn buckle 33 is on its outside fitted with grooves 35, into which pins 36 from a ring surrounding the turn buckle and accessible from the outside grip, and by turning this ring in one direction or another the milking organ 28 is moved outward or inward.

As has been mentioned before the arms 2 can be turned and are fastened to the stand, whereby the advantage is gained that the apparatus can be used for cows with different intervals between the teats, besides which one of the screws, for example 7, is so arranged that it may be moved longitudinally on the shaft, besides which the stand consists of two parts that may be moved relatively to one another, one of which supports two and the other the other two milking organs, so that the distance between the fore and hind teat cups can be increased or reduced if necessary.

The method of operating the machine is as follows: After it has been fixed in its place on the cow and started the milking organs receive a backward and forward motion through the oscillating wheels 10. When one of the teats has been milked dry the corresponding eccentric 23 is turned by means of its respective wingscrew 25, whereby the milking organ is disconnected. If it is to be connected up again afterward the eccentric is again turned, when parts of a spring 38 are brought back to their original position again.

Having now particularly described and ascertained the nature of my said invention and in which manner the same is to be performed I declare that what I claim is:

1. In a milking machine, the combination with a stationary shield and a movable milking shield for coaction therewith, of means for producing a forward and receding movement to said movable shield with respect to said stationary shield, such means including a toothed sector, means imparting oscillatory movement to said sector, a rack intermeshing with said toothed sector, and a connecting rod structure operatively connecting said toothed sector and said movable milking shield.

2. In a milking machine, the combination with a stationary shield, and a movable milking shield for coaction therewith, of means for producing a forward and receding movement to said second mentioned shield with respect to said stationary shield, such means including a toothed sector, means imparting oscillatory movement to said sector, a casing, a rack carried by said casing and intermeshing with said toothed sector, a spiral spring carried by said casing, and a connecting rod structure operatively connected to said movable milking shield and adapted to receive yieldable movement from the said rack through the resiliency of said spring.

3. In a milking machine, the combination with a stationary shield and a movable milking shield for coaction therewith, of means for producing a forward and receding movement to said second mentioned shield with respect to said stationary shield, such means including a toothed sector, means imparting oscillatory movement to said sector, a casing, a rack carried by said casing and intermeshing with said toothed sector, a spiral spring carried by said casing, a connecting rod structure operatively connected to said movable milking shield, and adapted to receive yieldable movement from the said rack through the resiliency of said spring and means for disalining said connecting rod structure with respect to said spiral spring whereby the former is rendered inactive.

4. In a milking machine, the combination with a stationary shield, and a movable milking shield coacting therewith, of a toothed sector, means imparting oscillatory movement to said sector, a casing, a rack carried by said casing and intermeshing with said toothed sector, a compression spring carried by said casing, adjustable means confining said spring within said casing, at one end thereof, a jointed connecting rod operatively connected to said movable shield, and alined with said compression spring, at the free end thereof, to receive yieldable movement from said rack, a movable bearing for said connecting rod, adjacent the free end of said spring, and means for actuating said bearing laterally, whereby said connecting rod is disalined with respect to said spiral spring for rendering the said rod inactive.

5. In a milking machine, the combination with a stationary shield and a movable milking shield coacting therewith, of a toothed sector, means imparting oscillatory movement to said sector, a casing, a rack carried by said casing and intermeshing with said toothed sector, a compression spring carried by said casing, means confining said spring within said casing, at one end thereof, a jointed connecting rod operatively connected to said movable shield and alined with said compression spring, at the free end thereof, to receive yieldable movement from said rack, a movable bearing for said connecting rod, adjacent the free end of said spring, and means for actuating said bearing laterally whereby said connecting rod is disalined with respect to said spiral spring for rendering the said rod inactive.

6. In a milking machine, the combination with a stationary shield, and a movable milking shield coacting therewith, of a toothed sector, means imparting oscillatory movement to said sector, a casing, a rack intermeshing with said toothed sector, a compression spring carried by said casing, means confining said spring within said casing, at one end thereof, a jointed connecting rod operatively connected with said movable shield and alined with said compression spring, at the free end thereof, to receive yieldable movement from said rack, a movable bearing for said connecting rod adjacent to the free end of said spring, a bell-crank lever operatively connected at one end to said bearing, and means actuating the said bell-crank lever for producing movement of said bearing laterally, whereby said connecting rod is disalined with respect to said spiral spring to render the said rod inactive.

7. In a milking machine, the combination with a stationary shield and a movable milking shield, coacting therewith, of a toothed sector, means imparting oscillatory movement to said sector, a casing, a rack intermeshing with said toothed sector, a compression spring carried by said casing, means confining said spring within said casing at one end thereof, a jointed connecting rod operatively connected to said movable shield, and alined with said compression spring, at the free end thereof, to receive yieldable movement from said rack, a movable bearing for said connecting rod adjacent to the free end of said spring, a bell-crank lever operatively connected at one end to said bearing, and a cam engaging the other end of said bell-crank lever to operate the latter to move said bearing laterally, whereby said connecting rod is disalined with respect to said spiral spring for rendering said rod inactive.

8. In a milking machine, the combination with a main frame structure, of an arm pivotally mounted to said frame structure to swing in a horizontal plane and provided with a stationary and a movable milking shield, a toothed sector pivotally carried by said frame structure concentric with the arc of movement of said arm, a rack intermeshing with said toothed sector, and a connecting rod structure operatively connecting said toothed sector and said movable milking shield for producing a forward and receding movement with respect to said stationary shield.

9. In a milking machine, the combination with a main frame structure, of an arm pivotally mounted to said frame structure to swing in a horizontal plane and provided with a stationary and a movable milking shield, a toothed sector pivotally carried by said frame structure concentric with the arc of movement of said arm, a casing, a rack carried by said casing and intermeshing with said toothed sector, a spiral spring carried by said casing, and a connecting rod structure operatively connected to said movable milking shield and adapted to receive yieldable movement from the said rack through the resiliency of said spring.

10. In a milking machine, the combination with a main frame structure, of an arm pivotally mounted to said frame structure to swing in a horizontal plane and provided with a stationary and a movable milking shield, a toothed sector pivotally carried by said frame structure concentric with the arc of movement of said arm, a casing, a rack carried by said casing and intermeshing with said toothed sector, a spiral spring carried by said casing, a connecting rod structure operatively connected to said movable milking shield and adapted to receive yieldable movement from the said rack through the resiliency of said spring, and means for disalining said connecting rod structure with respect to said spiral spring, whereby the former is rendered inactive.

11. A milking machine comprising in combination, a frame structure provided with an arm pivotally mounted to swing in a horizontal plane, a second frame structure movable with respect to said first mentioned frame structure, provided with an arm pivotally mounted to swing in a horizontal plane, a toothed sector for each of said frame structures, pivoted concentric with the arc of movement of the respective arm associated therewith, a main drive shaft carried by both of said frame structures, motion transmitting means imparting oscillatory movement to said toothed sectors from said drive shaft, a coöperating stationary and movable milking shield provided for each of the said arms, and means for imparting forward and receding movement to said movable milking shields, from said toothed sectors.

12. A milking machine comprising in combination, a frame structure provided with an arm, pivotally mounted to swing in a horizontal plane, a second frame structure, movable with respect to said first mentioned frame structure provided with an arm pivotally mounted to swing in a horizontal plane, a toothed sector for each of said frame structures pivoted concentric with the arc of movement of the respective arm associated therewith, a main drive shaft carried by both of said frame structures, motion transmitting means imparting oscillatory movement to said toothed sectors from said drive shaft, a coöperating stationary and movable milking shield provided for each of the said arms, a rack intermeshing with said toothed sectors, and a connecting rod structure operatively connecting said toothed sector and said movable shield for producing a forward and receding movement with respect to said stationary shield.

13. A milking machine comprising in combination, a frame structure provided with an arm pivotally mounted to swing in a horizontal plane, a second frame structure movable with respect to said first mentioned frame structure, provided with an arm pivotally mounted to swing in a horizontal plane, a toothed sector for each of said plane structures, pivoted concentric with the arc of movement of the respective arm associated therewith, a main drive shaft carried by both of said frame structures, motion transmitting means imparting oscillatory movement to said toothed sectors from said main drive shaft, a coöperating stationary and movable milking shield provided for each of the said arms, a casing, a rack carried by said casing and intermeshing with said toothed sector, a spiral spring carried by said casing, and a connecting rod structure operatively connected to said movable milking shield and adapted to receive yieldable movement from the said rack through the resiliency of said spring.

In testimony whereof I have signed my name to this specification in the presence of two witnesses.

KARL WILHELM JOHANSSON.

Witnesses:
C. SPRING,
H. THERLING.

---

Copies of this patent may be obtained for five cents each, by addressing the "Commissioner of Patents, Washington, D. C."